Figure 1:
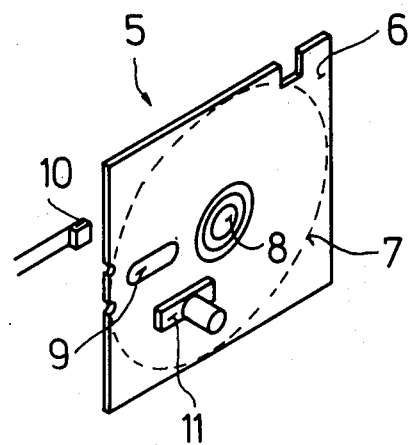

United States Patent [19]

Gruehn et al.

[11] Patent Number: 4,688,129
[45] Date of Patent: Aug. 18, 1987

[54] PROTECTIVE JACKET FOR A DISK-SHAPED RECORDING MEDIUM

[75] Inventors: Dietrich Gruehn, Appenweier; Hubert Fehrenbach, Kehl; Norbert Holl, Battenberg, all of Fed. Rep. of Germany

[73] Assignee: BASF Aktiengesellschaft, Ludwigshafen, Fed. Rep. of Germany

[21] Appl. No.: 868,702

[22] Filed: May 30, 1986

[30] Foreign Application Priority Data

Jun. 7, 1985 [DE] Fed. Rep. of Germany ... 8516550[U]

[51] Int. Cl.4 .............................................. G11B 23/03
[52] U.S. Cl. .................................... 360/133; 360/137
[58] Field of Search .......................... 360/133, 137, 99

[56] References Cited

U.S. PATENT DOCUMENTS 4,052,750 10/1977 Barber et al. ...................... 360/135
4,409,630 10/1983 Saito ..................................... 360/99
4,479,579 10/1984 Miklos ................................ 360/137
4,577,251 3/1986 Okada ............................ 360/128 X Primary Examiner—A. J. Heinz
Attorney, Agent, or Firm—Keil & Weinkauf

[57] ABSTRACT

A protective jacket, in particular for recording media, preferably magnetic films, is provided with at least one stiffened region in the immediate vicinity of the read/write area, thus permitting more thorough cleaning of the recording medium and smoother running of the latter. Stiffened region(s) can be produced economically by printing on strips of ink.

13 Claims, 5 Drawing Figures

U.S. Patent    Aug. 18, 1987    Sheet 1 of 2    4,688,129

PROTECTIVE JACKET FOR A DISK-SHAPED RECORDING MEDIUM

The present invention relates to a protective jacket for a disk-shaped recording medium, in particular a flexible data recording medium, comprising a blank of plastic material which is folded and joined together at at least three edges, to produce a jacket which is open along at most one edge, the jacket possessing at least one read/write opening, and parts of the jacket having a different flexibility.

Such protective jackets for audio, video and data recording disks, films, X-ray plates, etc. are generally in the form of flat envelope-like jackets. Regardless of the recording material which has been used in the particular recording medium, and which may be suitable for storing signals magnetically, optically etc. it is desirable to keep the recording medium free from dirt, dust, etc., in order that it affects playback of the recorded signals as little as possible. The danger of dust, etc. entering the jacket is greater when the recording medium is removable from the jacket than when the recording medium, in the case of a flexible magnetic medium, is completely enclosed by the jacket except for a few openings, and remains enclosed during recording/playback operations, as in the case of, for example, the FlexyDisk ® ( ® trademark of BASF Aktiengesellschaft).

FlexyDisk jackets are currently produced in general in the form of a blank from thin rigid PVC film or another suitable plastics film. The blank is provided prior to folding, with a nonwoven fabric on the surface which is subseqently to become the inside of the jacket, and is punched, folded to form a jacket, and welded at the side tabs which project when folding has been carried out.

The disk-shaped substrate medium coated with magnetic dispersion is inserted into the jacket, which is still open at one edge, after which the end tab is folded and welded, and the magnetic medium is thus protected on all sides. This magnetic medium remains inside the jacket when used in a FlexyDisk drive for recording/playback of signals.

As the magnetic medium rotates, in use, within the jacket, the nonwoven fabric rubs against the surface of the magnetic medium and cleans it. However, this cleaning is effected in a relatively non-uniform manner since the flexibility of the jacket is such as to cause the fleece to come into contact with the magnetic layer only in places, in an irregular manner.

German Laid-Open Application DOS No. 3,048,778 discloses that, around the read/write opening (referred to as R/W opening below), an attracting plate made of a ferromagnetic material is adhesively bonded to the outside of the jacket or is molded into the jacket material, with the aim of establishing a uniform distance between the jacket walls and furthermore of reinforcing the jacket. Moreover, this measure is attempted to impart exact dimensions to the R/W openings. However the plate, being made of ferromagnetic material, is expensive to produce and mount and is unsuitable for the large-scale production of jacketed disk-shaped recording media.

U.S. Pat. No. 4,052,750 discloses that a reinforcing ring, for example a ring made of calendered paper coated with a mixture of calcium carbonate, clay and starch, and if appropriate carbon for reducing the electrical resistance, can be employed around the central drive hole of the FlexyDisk, and fastened by means of a suitable, preferably conductive, adhesive in order to increase the abrasion resistance and improve the precision of centering in the region of the central opening of the FlexyDisk. However once again, the reinforcing ring is very expensive to produce and mount and is therefore hardly suitable for the large-scale production of FlexyDisks.

It is also known to reinforce the central opening with a ring by applying a curable layer, for example one consisting of resin material.

Such measures are not known for the R/W opening, since increased wear does not occur at this point.

It is an aim of the present invention substantially to avoid the occurrence of transient errors (errors which occur sporadically).

We have found that this aim is achieved by a novel protective jacket of the kind referred to if one or both sides of the read/write opening(s) are provided with a region of greater rigidity on the jacket, in particular adjacent to the or each read/write opening in the running direction of the recording medium, said region(s) cleaning the read/write area of the recording medium over a large area during rotation of the recording medium in the protective jacket, preferably directly before the read/write operation.

As a result of providing the jacket with regions of greater rigidity adjacent to the read/write opening(s), the jacket is constantly subjected to a load roughly parallel to the R/W opening and over the entire data area, with the result that the cleaning effect is improved regardless of the particular head position.

The following versions are intended to represent modifications to the production of the protective jacket according to the invention.

For example, one or more additional strips of material may be fastened to the jacket wall or walls, on the inside.

It is also possible to apply a layer, particularly one made of a curable material, to the jacket.

Furthermore, one or more beads may be formed in the jacket wall or walls in a simple manner.

It is advantageous to produce the layers or beads by printing one or more strips of solvent-containing ink on the inside or outside of the jacket wall or walls. Incipient dissolution of the PVC jacket material at the surface produces bead-like arches.

It is also possible to provide two radial strips, radial layers or radial beads which are opposite one another with respect to the axis of the recording medium.

It is also advantageous if radial strips, radial layers or radial beads which are opposite one another, parallel and displaced with respect to one another are provided.

Finally, it may be advantageous to use a plurality of projections, stamped elements or other deformations in order to form the region(s) of greater rigidity.

Figure 2:
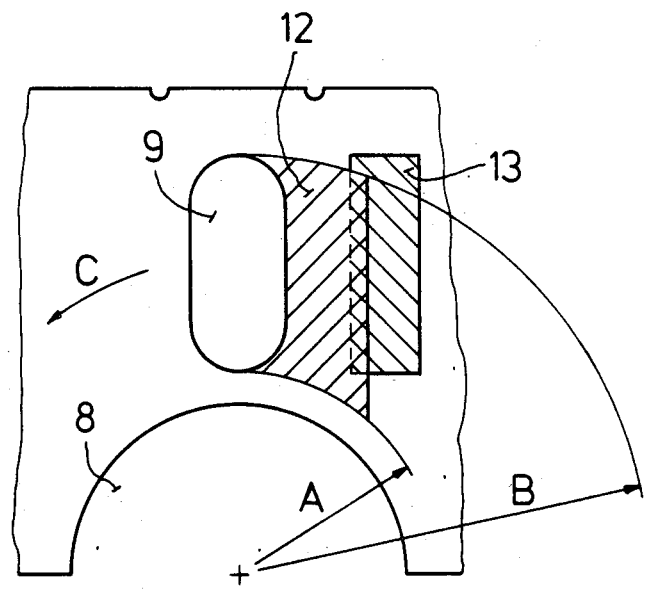
Figure 3:
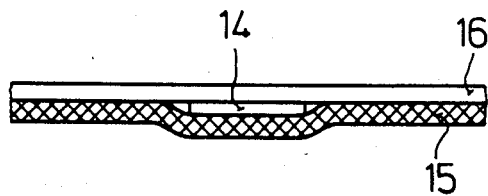
Figure 4:
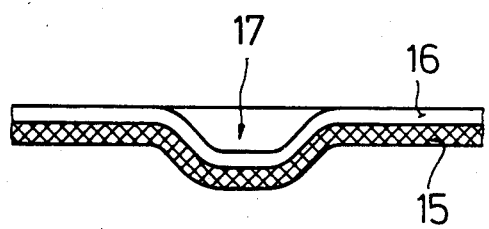
Figure 5:
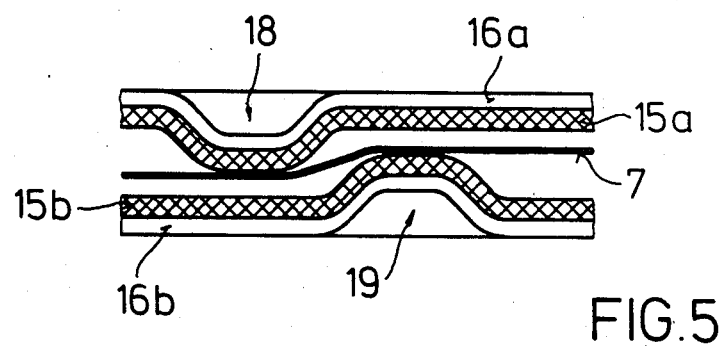

Embodiments of the protective jacket will now be described, by way of example, with reference to the accompanying drawings, in which FIG. 1 shows a FlexyDisk with a head and pressure pad, FIG. 2 shows a FlexyDisk stiffened according to the invention, FIG. 3 illustrates stiffening by means of a strip of material or a layer, FIG. 4 shows a stiffening element in the form of a bead, and FIG. 5 shows a stiffening element in the form of two beads opposite one another.

FIG. 1 illustrates a flexible magnetic disk, e.g. a FlexyDisk 5, in the form of a square jacket 6 containing a disk-shaped magnetic medium 7. The magnetic medium 7 is driven, via a central opening 8, by a rotary drive means (not shown). An elongated R/W opening 9 extends radially over the entire recording area of the FlexyDisk 5. A head 10 is movable into contact with the magnetic medium 7 in the region of the R/W opening 9, which contact is usually maintained by a resilient backing pressure element 11.

The jacket 6 is flexible, being made, for example, of a flexible rigid PVC material, and adapts to any pressure, even when it is irregularly distributed over the surface. A cleaning web of nonwoven fabric (15, 15a, 15b) is usually provided on the inside of the jacket walls and ensures that the film is cleaned as it rotates. The cleaning effect necessarily depends on the particular local pressure exerted by the jacket wall provided with the nonwoven fabric on the magnetic medium 7.

Transient errors occur during the R/W operation generally as a result of foreign particles which come between the head 10 and the magnetic medium 7. In some cases, interference due to such foreign particles is counteracted by the pressure element 11, which is frequently in the form of a cushion, facilitating removal of loose particles. In practice, however, irregular contact between the nonwoven fabric and the magnetic medium 7 does not provide error-free operation.

According to the invention, such errors are successfully avoided if a region of greater rigidity is provided on the jacket over a large area on one or both sides adjacent to the R/W opening, the said region(s) improving the cleaning effect over a large area for the R/W operation. In any case that jacket wall which faces away from the head 10 should be provided with greater rigidity compared with the rigidity of the remainder of the jacket material; it is of course also possible for the two opposite walls to be provided with greater rigidity, at least in the vicinity of the R/W opening 9. The localized region of greater rigidity can be defined by the difference between the radii A and B in FIG. 2 (cf. area 12). In the case of FlexyDisks of conventional sizes, this difference is about 36 or 53 mm. However, it is also possible for the region to be spaced a distance from the R/W opening as in the case of area 13. The running direction of the magnetic medium 7 is indicated by arrow C in FIG. 2 so that, viewed in the running direction. the area of stiffness is advantageously before the R/W opening 9 and hence also before the head 10. Consequently, only regions of the magnetic medium which have just been cleaned are subjected to R/W operations.

As shown in FIG. 3, the stiffened region 12 or 13 can be produced by applying a suitable strip of material 14, the nonwoven fabric being designated by 15 and the jacket wall by 16. The strip 14 should be adhered or otherwise fastened in a suitable manner. Alternatively, the strip 14 may be produced by coating with a suitable liquid or pasty material. FIGS. 4 and 5 show alternative means for providing stiffened strips or regions. In particular, the stiffened strips are in the form of a beading or beadings 17-19 (in FIG. 5, the jacket walls are designated by 16a and 16b). The required deformation of the material is very small in the region of the beading 17-19.

The maximum height of the strip or strips, deformation or deformations, layer or layers or beading or beadings is determined by the total thickness laid down for conventional FlexyDisks (2.1 mm in the case of 5.25 inch and 8 inch) and must not be exceeded.

The existing thicknesses of the jacket walls, of the nonwoven fabric and of the magnetic medium determine the remaining permissible maximum height of the one or two deformations, etc., and there are therefore generally only a few tenths of a millimeter available as maximum heights, so that the layer or layers or the beading or beadings are advantageously produced by printing on a strip of solvent-free or solvent-containing ink. When producing a layer, the latter is printed on the inside of the jacket wall (as the strip in FIG. 3), the ink being as far as possible solvent-free. If it is intended to produce a beading 17-19, this can advantageously be done by printing a solvent-containing ink on the outside of the jacket wall dissolution of the material on the surface of the jacket wall, e.g. the PVC, surprisingly giving the desired curvature of the material toward the inside.

The cleaning effect achieved in each of the embodiments described can be further increased by means of stiffened regions arranged opposite one another and/or displaced with respect to one another, as demonstrated, by way of example, by beadings 18 and 19 in FIG. 5. This results in slight deformation of the magnetic medium 7 and further increases contact with the nonwoven fabric.

It is also possible for the cleaning fabric 15, 15a, 15b to be provided essentially in the stiffened region 12, 13. In experiments in practice it was found that any transient errors are virtually completely avoided if a stiffened region or stiffened regions according to the invention are provided on the jacket 6.

We claim:

1. A protective jacket for a disk-shaped recording medium, in particular a flexible data recording medium, comprising a flexible blank of plastic material which is folded and joined together at least three edges, to produce a jacket which is open along at most one edge, the jacket possessing two planar jacket walls and at least one read/write opening, said flexible data recording medium being rotated within the jacket for read/write operations in a predetermined direction, wherein certain parts of the jacket have different degrees of flexibility and at least one portion of a jacket wall adjacent the read/write opening when viewed in said predetermined direction of rotation of the medium of the read/write opening is provided with a region which has a greater rigidity than the plastic material of the other parts of the jacket, the said region cleaning the read/write area of the recording medium over a large area during rotation of the recording medium in the protective jacket.

2. A protective jacket as claimed in claim 1, wherein the at least one region of greater rigidity is provided adjacent to the read/write opening in the running direction of the recording medium.

3. A protective jacket as claimed in claim 1, wherein the at least one region of greater rigidity is formed by an additional strip of material which is mounted on the inside on one or both jacket walls.

4. A protective jacket as claimed in claim 1, wherein the region of greater rigidity is formed by one or more layers applied to one or both jacket walls.

5. A protective jacket as claimed in claim 1, wherein the region of greater rigidity is formed by one or more beads in one or both jacket walls.

6. A protective jacket as claimed in claim 1, wherein the region of greater rigidity is formed by one or more strips of solvent-containing ink printed on one or both jacket walls.

7. A protective jacket as claimed in claim 1, wherein two regions of greater rigidity are provided, the said regions being opposite one another with respect to the recording medium.

8. A protective jacket as claimed in claim 1, wherein two regions of greater rigidity are provided, the regions being about as long as the read/write opening and being parallel to one another on the two jacket walls.

9. A protective jacket as claimed in claim 1, wherein two regions of greater rigidity are provided, the regions being as long as the read/write opening and being arranged parallel to one another but displaced laterally with respect to the central axis of the read/write opening.

10. A protective jacket as claimed in claim 1, wherein the at least one region of greater rigidity is formed by projections.

11. A protective jacket for a disk-shaped recording medium, in particular, a flexible, data recording medium, comprising a blank of flexible plastic material which is folded and joined together at at least three edges to produce a jacket which is open along at most one edge, the jacket possessing two planar jacket walls with at least one read/write opening in one of the jacket walls, certain parts of the jacket having different degrees of flexibility, wherein at least one side of the read/write opening is provided with a region of greater rigidity on the jacket, the said region cleaning the read/write area of the recording medium over a large area, and being formed by at least one bead which is produced by a strip printed on an outside of the jacket wall, and the strip comprising an ink which contains a solvent which dissolves the plastic material of the jacket at the surface.

12. A protective jacket as claimed in claim 11, wherein at least one bead, which is produced by printing on ink, is provided on each jacket wall.

13. A protective jacket as claimed in claim 11, wherein at least one bead, produced by printing on ink, is arranged on each jacket wall and the beads are displaced with respect to one another and with respect to the recording medium, with the result that the recording medium is slightly deformed while making contact with the beads.

* * * * *

UNITED STATES PATENT AND TRADEMARK OFFICE
CERTIFICATE OF CORRECTION

PATENT NO. : 4,688,129

DATED : August 18, 1987

INVENTOR(S) : Dietrich GRUEHN et al.

It is certified that error appears in the above-identified patent and that said Letters Patent is hereby corrected as shown below:

Column 4, lines 54 and 58
[the] at least should be:
at least

Column 5, line 18
[the] at least should be:
at least

Column 4, line 38
[together at least]

should be:
together at at least

Signed and Sealed this

Twenty-ninth Day of December, 1987

*Attest:*

DONALD J. QUIGG

*Attesting Officer*  *Commissioner of Patents and Trademarks*